Figure 1:
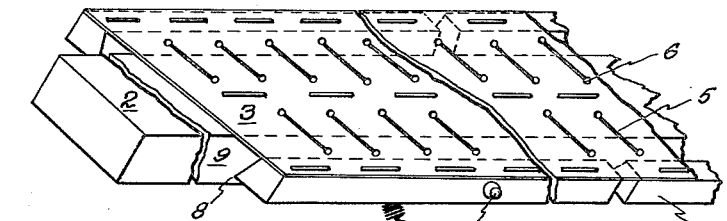
Figure 2:
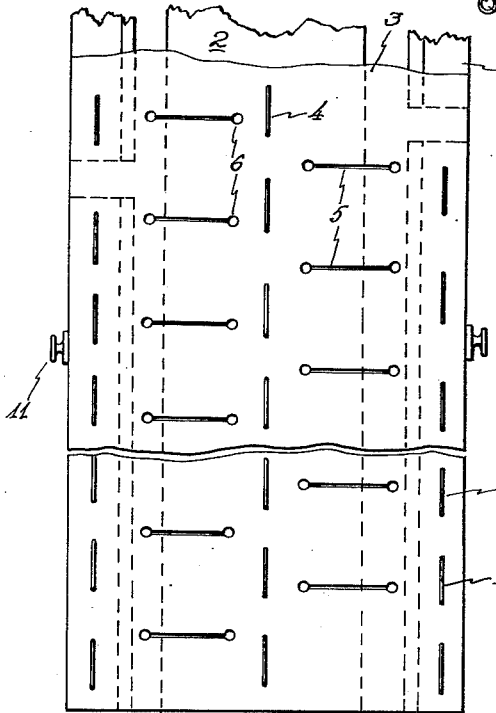
Figure 3:
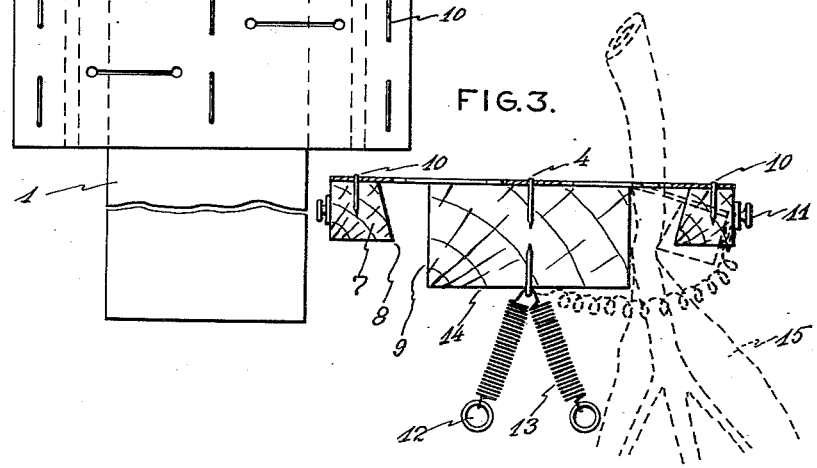

Oct. 8, 1957  M. A. ARANDA  2,809,068

TOBACCO LEAF HOLDING DEVICE

Filed May 24, 1954

INVENTOR.
MARCELO ALBERTO ARANDA

BY Robert H. Jacob

AGENT

United States Patent Office 2,809,068
Patented Oct. 8, 1957

2,809,068

TOBACCO LEAF HOLDING DEVICE

Marcelo Alberto Aranda, Buenos Aires, Argentina

Application May 24, 1954, Serial No. 431,984

9 Claims. (Cl. 294—5.5)

This invention consists of a novel device for holding tobacco leaves and offers many advantages in comparison with the devices now known in the art.

Certain difficulties arise during the process of tying the leaves to the canes or carrying rods, said process consisting of attaching the leaves, two at a time, with pieces of string to opposite sides along the length, or the greater part of the length, of a cane or rod and carrying them, thus attached, to the curing sheds for treatment.

The leaves are afterwards stacked, and after seasoning or curing the strings are either unfastened or cut to save time to liberate the pairs of leaves alternately from the carrying rods. The leaves are then classified and finally arranged in bundles.

The process is consequently troublesome and requires considerable manipulative skill owing to the intricate nature of the work.

Furthermore the stems of the leaves tend to shrink on drying with the result that they become loosened in the loops of wire and fall out consequently prejudicing the economy of the process.

The device of the present invention consists in general terms of a rod or batten, hereinafter called the main batten, preferably of rectangular section, and one or more longitudinal, laminated sheets of flexible material having at least one row of internal slits arranged substantially crosswise of the sheet. The sheets or sheet is fixed longitudinally upon the upper surface of the main batten in such a manner that a free edge of the sheet extends beyond the corresponding edge of the main batten and the slits are so arranged that an end portion of each slit extends partially beyond the adjacent edge of the main batten.

Adjacent each narrow side of the main batten a plurality of shorter battens, hereinafter called the side battens, of trapezoidal section, are attached to the under surface of the extending side borders of the elastic sheet. These side battens are arranged parallel to the narrow sides of the main batten and in such a manner that each of the side battens has an acute-angled edge directed towards the corresponding nearest side of the main batten.

Elastic attachment means are provided on the under side of the main batten and together with holding means situated on the outer edges of the side battens urge or bias the said acute-angled edges of the side battens into contact with the corresponding edges of the main batten.

The tobacco leaves are attached to the carrying device by lifting the side batten and inserting the stem of one leaf at a time into each slit of the sheet. After all the slits corresponding to one side batten have been filled that side batten is pressed against the stems of the hanging leaves and the elastic attachment means are fastened to hold same firmly in position; the leaves are now held in part by the acute-angled edge of the corresponding side batten pressing against the edge of the main batten by virtue of the elastic attachment means, and partly by the elasticity of the edges of the sheet of laminated material through which the stems extend.

In spite of the shrinkage that always takes place in the size of the leaf stems on drying, the side battens bring constant edge pressure to bear upon the stems and hold these stems firmly. This gripping action is due to the constantly urging elastic means of attachment.

The following practical advantages are derived from the present invention:

(1) Substantial saving of time in attaching and detaching leaves to and from the leaf holding device described herein.

(2) Improvement in the curing process due to the fact that the leaves are more uniformly distributed in the curing ovens and therefore receive a more uniform treatment. Heretofore the leaves were attached in pairs in which case many leaves tended to stick together and become folded during attachment leading to irregular curing and staining instead of uniform colouring.

(3) Steady and constant retaining hold upon the stems of the leaves during shrinking, thereby preventing losses due to broken stems or fallen leaves.

(4) Saving of string as this is no longer required.

(5) Improvements in and simplification of labour requirements, apart from the complete elimination of the manipulation of pieces of string heretofore used for tying the leaves together. A rapid visual classification of the leaves can now be made by the same operator who liberates the individual leaves by loosening the spring attachment. A single operator can now unfasten and classify the leaves simultaneously, owing to the ease with which they can now be picked out of their slits in between the battens, and also enabling him to form suitably sized bundles of leaves by twisting or binding one leaf around a number of the same. Thus a single operator can perform three stages of the process now usually delegated to three operators working separately, namely, one to detach leaves from their wires etc., a second to classify and a third to prepare and bind the bundles of marketable leaves. In certain cases, especially in places where, and/or at times when, the atmosphere is very dry, this process possesses the further advantage in that the tobacco can be worked under suitable conditions without having recourse to the step of humidifying the same. In accordance with this invention it is now possible to remove the leaf holders one at a time from the stacks wherein the ideal degree of dampness is maintained and thus proceed with the rapid classification etc., described above, without attending to the dehydration of the leaves until the leaves are finally bundled in the final step of the process.

Stated shortly this invention provides:

(a) Acceleration of the whole curing process of tobacco leaves.

(b) Improvement in curing the tobacco.

(c) Prevention of loss of leaves during curing.

(d) Saving of material.

(e) Economy of labour.

(f) Suitable degree of moisture for working the leaves.

For easy comprehension of the present invention a sheet of drawings is attached hereto, wherein one preferred embodiment is illustrated.

Fig. I is a view in perspective of a portion of the device in accordance with this invention.

Fig. II is a plan of the device shown in Fig. I.

Fig. III is a sectional view of the device shown in Figs. I and II.

The reference numbers refer to the same parts in all the drawings.

It will be seen from the drawings that the device of this invention consists of a main batten, 1, having a quadrilateral section, which batten can be of wood or any other suitable material. Laminated material or sheet 3 is attached by a row of staples 4 to the upper surface 2 of the main batten 1. Sheet 3 is made of flexible material or substance comprising one or more laminated sheets of material and is provided with stiffening and/or strengthening and waterproofing means. Staples are arranged in a row along the center of sheet 3, corresponding with the longitudinal center line of the main batten 1.

The two longitudinal edges of the sheet 3, extend well beyond the two side edges of the main batten 1. In accordance with the invention sheet 3 is provided with a row of transverse slits 5, in each of its longitudinal halves, the slits of one half being staggered in respect to the position of the slits of the other half.

Each of slits 5 extends with one of its ends beyond the edge of the main batten 1, nearest to the slit 5, and is provided with circular openings 6, punched at each end. The object of openings 6 is to facilitate the insertion of the leaf stem in slits 5.

The side battens 7, of trapezoidal section, are attached to the under side of the sheet 3, in close proximity to the longitudinal edges of same, by means of staples 10, driven into their narrowest, parallel, longitudinal faces.

These side battens 7 have an acute-angled edge 8, directed towards the nearest side edge 9, of the main batten 1. Each of the side battens 7 is provided with at least one button or stud 11 attached to the outer side wall of same and adapted to receive and hold the ring or hook 12 provided at the detachable end of each of the helicoidal tension springs 13. Springs 13 are fixed to a central point on the under surface 14 of the main batten 1.

Having thus described the invention and the manner of its practical application, what is claimed as new and desired to be secured by Letters Patent is:

1. A device for holding tobacco leaves during treatment comprising in combination a main batten, a side batten spaced from and arranged on one side of said main batten, a sheet of flexible material secured to the tops of said main and side battens, said material being provided with a plurality of incisions arranged transversely to the longitudinal axis of said main batten and extending within the space between said main and side battens, and means attached to the bottom of said main batten and attachable to the bottom of said side batten for biasing said side batten toward said main batten to deform said incisions in said material.

2. A device for holding tobacco leaves during treatment comprising in combination a main batten, a pair of side battens spaced from and arranged one on each side of said main batten, a laminated sheet of flexible material secured to the tops of said main and side battens, said material being provided with a plurality of incisions arranged transversely to the longitudinal axis of said main batten and extending within the space between said side battens, and means attached to the bottom of said main batten and attachable to the bottoms of said side battens for biasing said side battens toward said main batten to deform said incisions in said material.

3. A device for holding tobacco leaves during treatment comprising in combination a main batten, a pair of side battens spaced from and arranged one on each side of said main batten, a laminated sheet of flexible material secured to the tops of said main and side battens, said material being provided with a plurality of stem holding incisions arranged transversely to the longitudinal axis of said main batten and extending in part over the surface of said main batten and within the spaces between said main and side battens, and spring means attached to the bottom of said main batten and attachable to the bottoms of said side battens for biasing said side battens toward said main batten to deform said incisions in said material to firmly grip the stems of said tobacco leaves.

4. A device for holding tobacco leaves during treatment comprising in combination a main batten, a pair of side battens spaced from and arranged one on each side of said main batten, a laminated sheet of flexible material secured along its longitudinal axis to the top of said main batten and along its longitudinal edges to the tops of said side battens, said main and side battens being arranged substantially longitudinally of said material, said material being provided with a plurality of stem holding incisions arranged transversely to the longitudinal axis of said main batten and extending within the space between said main and side battens, and means attached to the bottom of said main batten and attachable to the bottoms of said side battens for biasing said side battens toward said main batten to deform said incisions in said material to firmly grip the stems of said tobacco leaves.

5. A device for holding tobacco leaves during treatment comprising in combination a main batten, a pair of side battens spaced from and arranged one on each side of said main batten, a laminated sheet of flexible material secured to the tops of said main and side battens, said side battens being of substantially trapezoidal section and fixed to said material upon their narrowest parallel faces and having an acute-angled edge formed contiguous with the bottom of each side batten directed toward the nearest side of said main batten, said material being provided with a plurality of stem holding incisions arranged transversely to the longitudinal axis of said main batten and extending within the spaces between said main and side battens, and means attached to the bottom of said main batten and attachable to the bottoms of said side battens for biasing said side battens toward said main batten to deform said incisions in said material and to bias said edges of said side battens into contact with a corresponding edge of said main batten.

6. A device for holding tobacco leaves during treatment comprising in combination a main batten, a plurality of side battens spaced from and arranged on each side of said main batten, a laminated sheet of flexible material secured along its longitudinal axis to the top of said main batten and along its longitudinal edges to the tops of said side battens, each of the longitudinal edges of said material having secured thereto a plurality of side battens spaced end to end and slightly apart from each other, said material being provided with a plurality of stem holding incisions arranged transversely to the longitudinal axis of said main batten and extending within the space between said main and side battens, and spring means attached to the bottom of said main batten and attachable to the bottoms of said side battens for biasing said side battens toward said main batten to deform said incisions in said material to firmly grip the stems of the tobacco leaves.

7. A device for holding tobacco leaves during treatment comprising in combination a main batten, a pair of side battens spaced from and arranged one on each side of said main batten, means comprising at least one laminated sheet of flexible material secured longitudinally along its central portion to the top of said main batten and along its longitudinal edges to the tops of said side battens, said material being provided with two rows of slits one row being arranged in each of the longitudinal halves of said material, said slits of said rows extending within the space between said main and side battens, and resilient means attached to the bottom of said main batten and attachable to the bottoms of said side battens for biasing said side battens toward said main batten to deform said slits in said material.

8. A device for holding tobacco leaves during treatment comprising in combination a main batten, a pair of side battens spaced from and arranged one on each side of said main batten, means comprising at least one laminated sheet of flexible material secured longitudinally along its central portion to the top of said main batten and along its longitudinal edges to the tops of said side battens, said material being provided with two rows of slits one row being arranged in each of the longitudinal halves of said material and arranged substantially parallel to the longitudinal axis of said main batten, said slits of said rows extending within the space between said main and side battens and arranged to hold the stems of tobacco leaves pushed therethrough, and resilient means attached to the bottom of said main batten and attachable to the bottoms of said side battens for biasing said side battens toward said main batten to deform said slits in said material to firmly grip the stems of the tobacco leaves.

9. A device for holding tobacco leaves during treatment comprising in combination a main batten, a pair of side battens spaced from and arranged one on each side of said main batten, means comprising at least one laminated sheet of flexible material secured longitudinally along its central portion to the top of said main batten and along its longitudinal edges to the tops of said side battens, said material being provided with two rows of stem holding slits one row being arranged in each of the longitudinal halves of said material, said slits of said rows extending within the space between said main and side battens, said slits of one row being staggered in respect to the position of the slits of the other row, and resilient means attached to the bottom of said main batten and attachable to the bottoms of said side battens for biasing said side battens toward said main batten to deform said slits in said material to firmly griup the stems of the tobacco leaves.

References Cited in the file of this patent

UNITED STATES PATENTS

| | | |
|---|---|---|
| 132,627 | Bullock | Oct. 29, 1872 |
| 721,615 | Smith | Feb. 24, 1903 |
| 886,458 | Wren | May 5, 1908 |
| 1,533,942 | Parrish | Apr. 14, 1925 |